(12) United States Patent
Cho

(10) Patent No.: US 6,899,972 B2
(45) Date of Patent: May 31, 2005

(54) SECONDARY BATTERY WITH THERMAL PROTECTOR

(75) Inventor: Sung-Jae Cho, Cheonan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 114 days.

(21) Appl. No.: 10/270,006

(22) Filed: Oct. 15, 2002

(65) Prior Publication Data

US 2003/0077484 A1 Apr. 24, 2003

(30) Foreign Application Priority Data

Oct. 18, 2001 (KR) ........................................ 2001-64384

(51) Int. Cl.[7] .......................... H01M 2/00; H01M 14/00
(52) U.S. Cl. .............................. 429/61; 429/7; 429/175; 429/181; 429/163
(58) Field of Search .......................... 429/94, 176, 177, 429/175, 178, 185, 174, 163, 171, 62, 90, 181, 7; 204/196.04, 196.07, 196.1, 196.02; 363/50, 74

(56) References Cited

FOREIGN PATENT DOCUMENTS

| EP | 1032060 | * 8/2000 | ............ H01M/2/34 |
| JP | 11-67190 | * 3/1999 | ............ H01M/2/34 |
| JP | 11-067188 | 3/1999 | |
| KR | P2000-0062499 | 10/2000 | |

OTHER PUBLICATIONS

"Notice to Submit response" issued by Korean Intellectual Property Office dated on Jul. 25, 2003.

* cited by examiner

Primary Examiner—Raymond Alejandro
(74) Attorney, Agent, or Firm—Robert E. Bushnell, Esq.

(57) ABSTRACT

A secondary battery includes: a battery unit in which a cathode plate, a separator, and an anode plate are sequentially disposed upon one another and wound together; a can provided as a housing for the battery unit, and into which an electrolyte is injected; a cap assembly bound to an upper portion of the can; and a thermal protector installed in the can for electrically connecting an electrode lead drawn from the battery unit to an electrode terminal via the cap assembly, and for cutting off current flow when the battery unit is overcharged. When the inner temperature of the battery rises due to overcharging, the thermal protector installed in the can accurately detects the increase in temperature, and cuts off current flow, thereby preventing thermal runaway and improving reliability of the secondary battery.

28 Claims, 5 Drawing Sheets

SECONDARY BATTERY WITH THERMAL PROTECTOR

CLAIM OF PRIORITY

This application makes reference to, incorporates the same herein, and claims all benefits accruing under 35 U.S.C. §119 from my application SECONDARY BATTERY MOUNTING THERMAL PROTECTOR filed with the Korean Industrial Property Office on 18 Oct. 2001 and there duly assigned Ser. No. 2001-64384.

BACKGROUND OF THE INVENTION

1. Technical Field

The present invention relates to a secondary battery and, more particularly to, a secondary battery with a thermal protector capable of cutting off a current flow by sensing its inner temperature.

2. Related Art

Lithium secondary batteries, which are capable of repeatedly charging and discharging, have been rapidly developed in view of their higher operating voltage and higher energy density per unit weight, compared with nickel-cadmium (Ni—Cd) batteries and nickel-metal hydride (Ni-MH) batteries. The lithium secondary batteries can be classified into liquid electrolyte batteries and solid electrolyte batteries according to the electrolyte used. In general, batteries using a liquid electrolyte are referred to as lithium-ion batteries and batteries using a polymeric electrolyte are referred to as lithium polymer batteries.

However, the lithium polymer batteries have some safety problems. In particular, the lithium polymer batteries consist of a carbonic anode, a lithium oxide cathode, and an organic solvent electrolyte. When a lithium ion battery is overcharged, the electrolyte is decomposed at the cathode and the lithium metal is separated at the anode. As a result, the characteristics of the battery may degrade, and the battery may generate excess heat or even combust.

Since the lithium polymer electrolyte is locally overheated during charging and discharging operations, the polymeric electrolyte that is thermally sensitive may dissolve or soften. As a result, the electric current and potential are nonuniform, and a short circuit may occur. Also, there is a risk of fire or explosion.

In general, the mechanism that causes combustion or heat generation in the lithium ion battery can be explained by an internal short circuit and thermal runaway. To eliminate these risks, the lithium ion battery has been equipped with various kinds of protectors.

A secondary battery with such a protector is disclosed in Japanese Patent Laid-open No. 1999-67188 to Tsumamoto et al., entitled LEAD TERMINAL FOR SECONDARY BATTERY AND LITHIUM SECONDARY BATTERY, published on 9 Mar. 1999. In such a secondary battery, an anode lead terminal includes a lead end for a charging circuit (charging lead end), a collector lead end, a lead end for a discharging circuit (discharging lead end) which is diverged from the collector lead end, and a fuse interposed between the charging lead end and the collector lead end. The lead ends and the fuse are disposed between multiple sheets of resin films. The secondary lithium battery includes a battery unit and a base for the battery unit. As is well known, in the battery unit, a cathode sheet, a separator and an anode sheet are wound together.

The charging lead end and the discharging lead end of the anode lead terminal attached to the anode sheet protrude from the battery unit. A cathode lead terminal with a resin film thereon, attached to the cathode sheet, protrudes from the battery unit.

When the secondary battery having the above structure is overcharged generating heat, the temperature of the fuse installed in the anode lead terminal rises. When the temperature of the fuse rises to 130° C., for example, the fuse blows. As a result, the charging lead end is not electrically connected to the collector lead end, and a charging current flow is cut off.

The above-described secondary lithium battery has the following problems. The fuse is sealed in the resin films and inserted into the case, wherein a thickness of the fuse provides a small gap within the resin films. Since the electrolyte is contained in the case, the electrolyte permeates the fuse through the gap and changes the physical characteristics of the fuse. As a result, it is difficult for the fuse to correctly operate at a particular temperature. Therefore, the secondary battery is unreliable.

SUMMARY OF THE INVENTION

Accordingly, the present invention provides a safety-improved secondary battery with a thermal protector therein capable of cutting off current flow when the battery is overcharged.

In one aspect, there is provided a secondary battery comprising: a battery unit in which a cathode plate, a separator, and an anode plate are sequentially disposed upon one another and wound together; a can as a housing for the battery unit, into which an electrolyte is injected; a cap assembly bound to an upper portion of the can; and a thermal protector installed in the can, which electrically connects an electrode lead drawn from the battery unit to an electrode terminal via the cap assembly and cuts off a current flow when the battery unit is overcharged.

The thermal protector may comprise: a body; a fuse mounted on the body; a plurality of leads, each of which is connected to respective ends of the fuse; and a connector which is electrically connected to one of the plurality of leads. The body of the thermal protector may have a mount area for the fuse connected to the plurality of leads, and may have a surface area slightly greater than the can so as to be press-fitted into the can.

In the secondary battery according to the present invention, one end of the fuse may be welded to a terminal lead electrically connected to the electrode terminal, and the other end of the fuse may be welded to a tap lead electrically connected to the electrode lead.

Preferably, the connector of the secondary battery according to the present invention comprises: a lead plate; and a polymeric resin film wound on the lead plate.

Preferably, the fuse is formed of a low melting point material operable at a temperature of about 85–120° C.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE INVENTION

Figure 1:
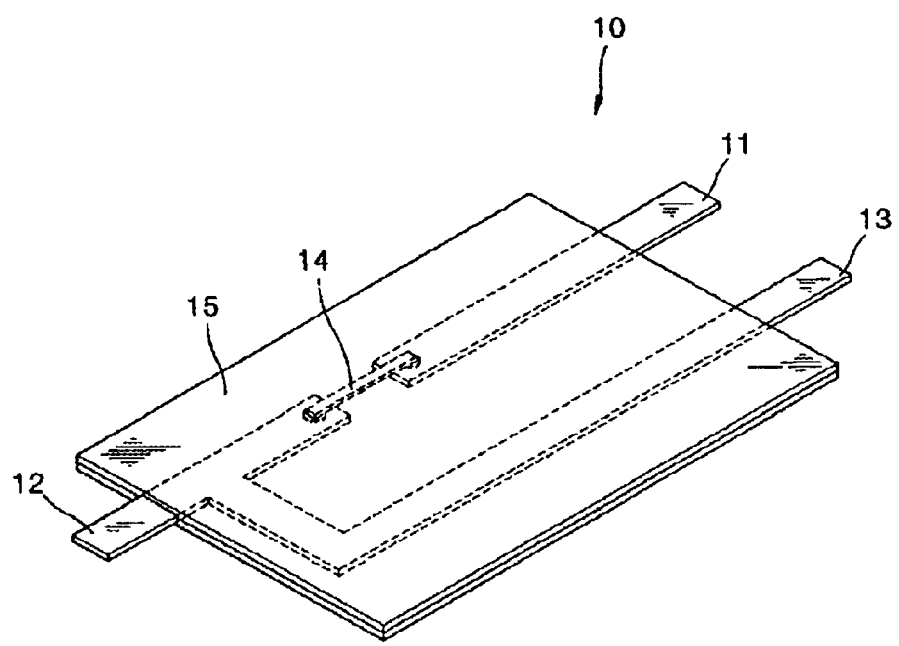
FIG. 1 is a perspective view of a lead terminal.

Referring to FIG. 1, an anode lead terminal 10 includes a lead end 11 for a charging circuit (charging lead end), a collector lead end 12, a lead end 13 for a discharging circuit (discharging lead end), which is diverged from the collector lead end 12, and a fuse 14 interposed between the charging lead end 11 and the collector lead end 12. The lead ends 11 through 13 and the fuse 14 are disposed between multiple sheets of resin films 15.

Figure 2:
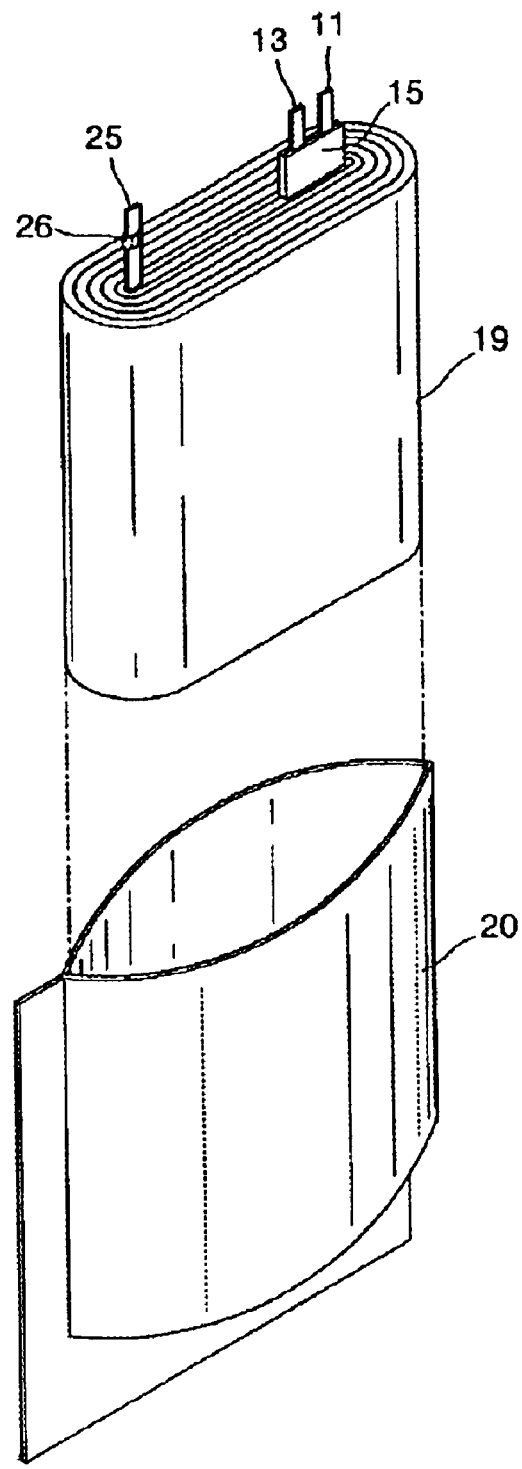
FIG. 2 is an exploded perspective view of a secondary battery with the lead terminal of FIG. 1.

A secondary lithium battery using the anode lead terminal 10 is shown in FIG. 2. Referring to FIG. 2, the secondary lithium battery includes a battery unit 19 and a case 20 for the battery unit 19. As is well known, in the battery unit 19, a cathode sheet, a separator, and an anode sheet are wound together.

The charging lead end 11 and the discharging lead end 13 of the charging lead terminal 10 attached to the anode sheet protrude from the battery unit 19. A cathode lead terminal 25 with a resin film 26 thereon, attached to the cathode sheet, protrudes from the battery unit 19.

When the secondary battery having the above structure is overcharged so as to generate heat, the temperature of the fuse 14 installed in the anode lead terminal 10 rises. When the temperature of the fuse 14 rises to 130° C., for example, the fuse 14 blows. As a result, the charging lead end 11 is electrically disconnected from the collector lead end 12, and a charging current flow is cut off.

The above-described secondary lithium battery has the following problems. The fuse 14 is sealed in the resin films 15 and inserted into the case 20, and a thickness of the fuse 14 provides a small gap within the resin films 15. Since the electrolyte is contained in the case 20, the electrolyte permeates the fuse 14 through the gap and changes the physical characteristics of the fuse 14. As a result, it is difficult for the fuse 14 to correctly operate at a particular temperature. Therefore, the secondary battery is unreliable.

Figure 3:
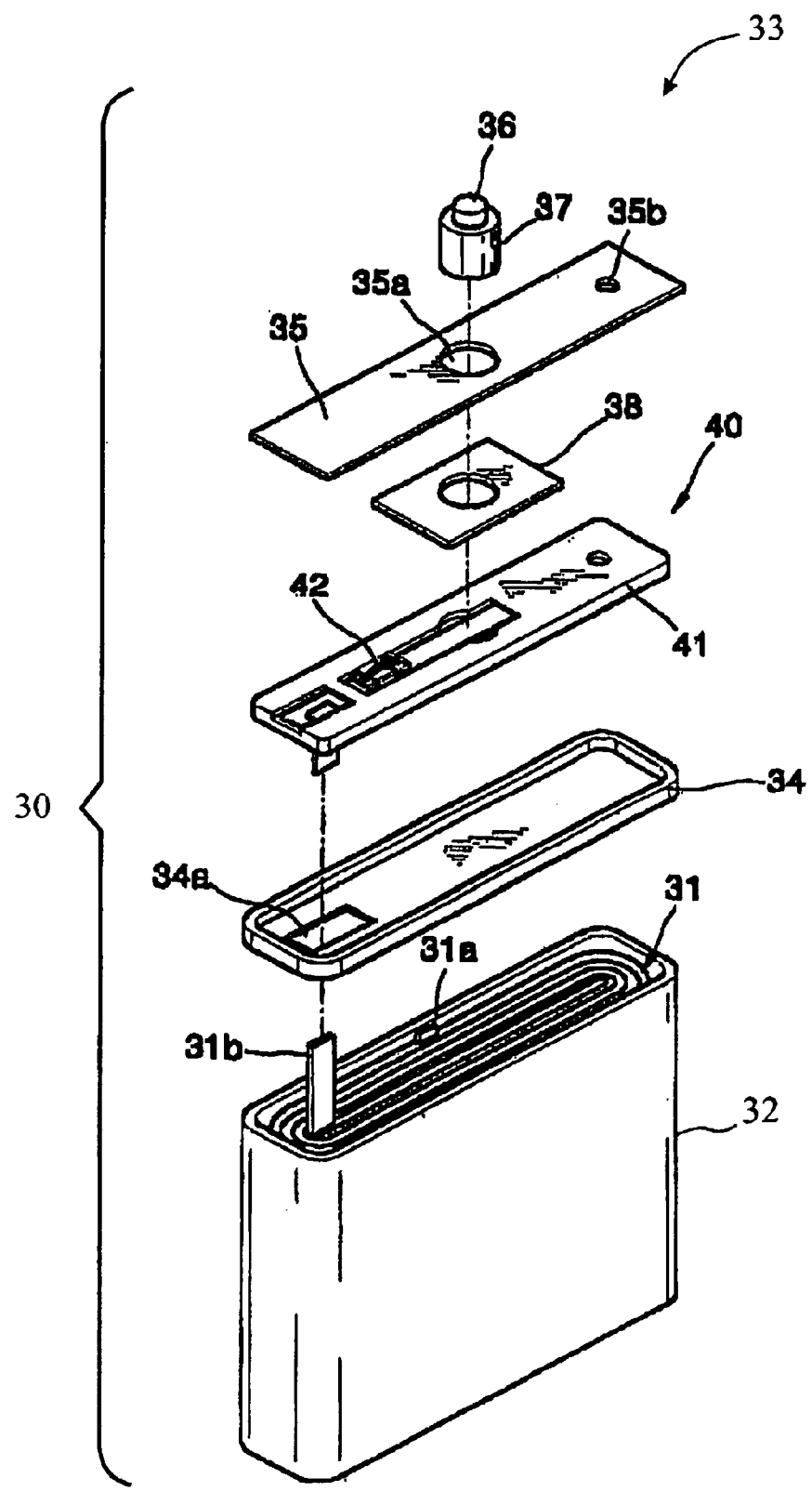
FIG. 3 is an exploded perspective view of a secondary battery according to an embodiment of the present invention.

A secondary lithium battery according to an embodiment of the present invention is shown in FIG. 3. Referring to FIG. 3, a secondary lithium battery 30 includes a battery unit 31, a can 32 into which the battery unit 31 is inserted, a cap assembly 33 coupled to the can 32, and a thermal protector 40.

The battery unit 31 includes a cathode plate, an anode plate, and a separator interposed between the cathode plate and the anode plate for electrically insulating the same. Each of the cathode plate and the anode plate includes a current collector and an active material layer coated on at least one surface of the current collector. The battery unit 31 is formed as a "jelly-roll" in which the cathode plate, the separator, and the anode plate sequentially disposed upon one another are wound together.

In the battery unit 31, a cathode lead 31a and an anode lead 31b protrude from one end of the cathode plate and the anode plate, respectively. An upper insulating plate 34 with a hole 34a, through which the anode lead 31b passes, is placed on an upper surface of the battery unit 31.

The thermal protector 40 is mounted on the insulating plate 34. The thermal protector 40 includes a body 41, a fuse 42 installed in the body 41, and a plurality of leads.

On the thermal protector 40, the cap assembly 33 to be coupled to the can 32 is mounted. The cap assembly 33 includes a cap plate 35 which is bound to an upper portion of the can 32 by welding.

The cap plate 35 has a hole 35a through which an electrode terminal 36 can be inserted. The electrode terminal 36 is electrically connected to one of the electrode leads drawn from the battery unit 31. In this embodiment, the electrode terminal 36 is an anode terminal electrically connected to the anode lead 31b. The cathode lead 31a is welded to the can 32. Alternatively, the positions of the cathode lead 31a and the anode lead 31b can be reversed. In that case, the element 31a would be an anode lead which is electrically coupled to the can 32, whereas the element 31b would be a cathode lead which is coupled to the electrode terminal 36 acting as a cathode terminal. A variety of embodiments are possible for the electrode connection structure.

The electrode terminal 36 is surrounded by a tubular gasket 37. The gasket 37 is formed of an insulating material, such as a polymeric resin, for electrical insulation between the cap plate 35 and the electrode terminal 36 and to prevent a leakage of the electrolyte from the can 32. The electrode terminal 36 surrounded by the gasket 37 is tightly fixed through the hole 35a of the cap plate 35 by riveting or spinning.

An insulating layer 38 may be placed below the cap plate 35. The cap plate 35 has an electrolyte injection hole 35b. After an injection of the electrolyte, the electrolyte injection hole 35b is sealed with a ball.

According to a feature of the present invention, the thermal protector 40, which is capable of rapidly cutting off current flow when the battery 30 is overcharged, is installed between the can 32 and the cap assembly 33. Since the thermal protector 40 is installed in the can 32, the risk of combustion or heat generation in the battery 30 is prevented, and reliability of the battery 30 is improved.

Figure 4:
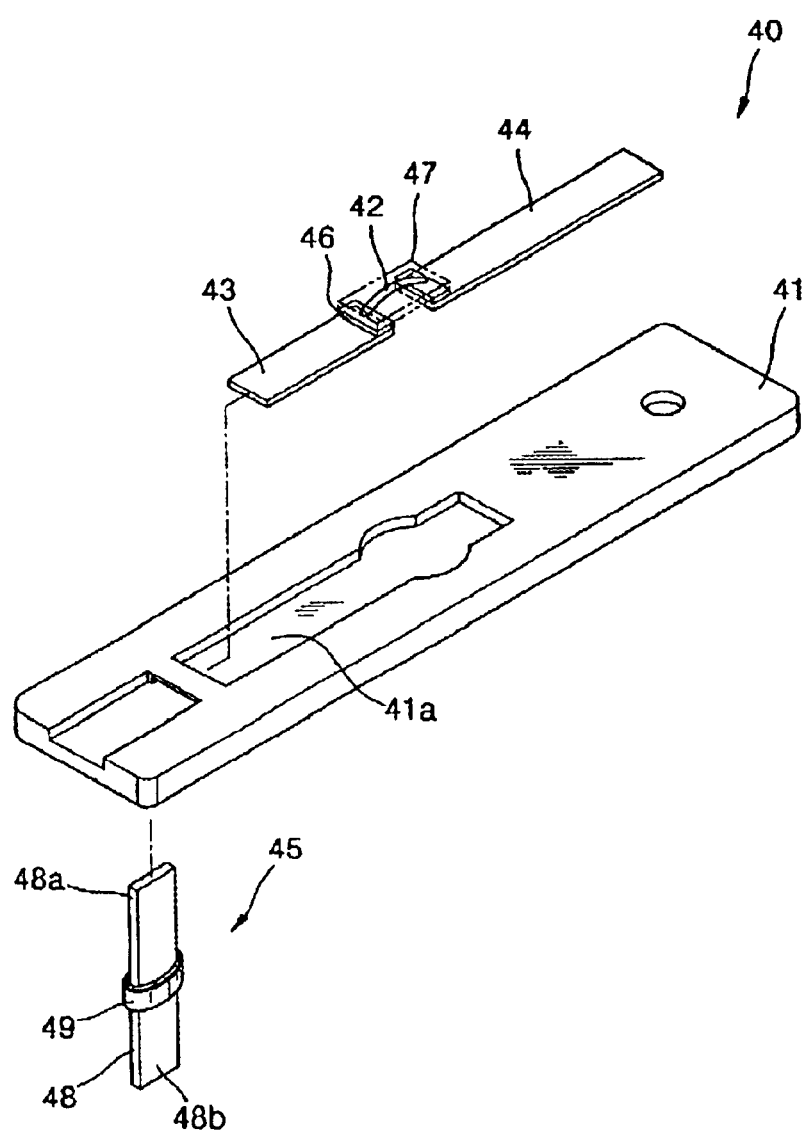
FIG. 4 is an exploded perspective view of a thermal protector of FIG. 3.

FIG. 4 is an exploded perspective view of the thermal protector 40. Referring to FIG. 4, the thermal protector 40 includes a body 41, a fuse 42 inserted into the body 41, a tap lead 43 and a terminal lead 44 which are electrically connected to the fuse 42, and a connector 45 electrically connected to the anode lead 31b drawn from the battery unit 31.

In particular, the body 41 is installed in the can 32. Accordingly, it is preferable that the body 41 be formed of a polymeric resin so as not to chemically react with the electrolyte. Advantageously, the body 41 is formed of a polymeric resin which expands thermally at high temperatures, and is press-fitted into the can 32 so as to prevent leakage of the electrolyte along the wall of the can 32. The body 41 is formed having a surface size slightly larger than that of the can 32.

The body 41 has a mount area 41a for the fuse 42. The mount area 41a may have a variety of shapes as long as it can allow the fuse 42 to operate at a particular temperature without reacting with the electrolyte.

The fuse 42 is mounted in the mount area 41a. The fuse 42 is formed of a low melting point material, for example, a lead alloy, capable of blowing due to the heat generated when the inner temperature of the battery 30 rises. One end of the fuse 42 is welded to the tap lead 43, with the other end being welded to the terminal lead 44. The fuse 42 operates at a temperature of about 85–120° C., and preferably, about 95±5° C.

Outer margins of the tap lead 43 and the terminal lead 44, to which the fuse 42 is welded, are coated with a sealing material 46. A polymeric resin 47, such as polyethyleneterephthalate (PET), is ultrasonically fused to the top surfaces of the tap lead 43 and the terminal lead 44, as well as to the fuse 42. The fuse 42 is double sealed with the sealing material 46 and the polymeric resin 47.

The fuse 42 welded to one end of each of the tap lead 43 and the terminal lead 44 is inserted into the mount area 41a of the body 41 to define its position.

Meanwhile, to prevent the thermal protector 40 from entering the can 32 and contacting the electrolyte, the connector 45 is formed in the body 41. The connector 45 includes a lead plate 48 electrically connected to the anode lead 31b, and a film 49 attached to the lead plate 48. The film 49 is formed of a polymeric resin which does not react with the electrolyte, and is preferably a triple-layer structure of chlorinated polypropylene (CPP), polyethylene (PE), and CPP. The film 49 is fused to the lead plate 48.

The connector 45 is integrally formed with the body 41. In particular, the connector 45 is inserted and integrated into the body 41 by insert molding. An upper lead 48a of the connector 45 is exposed to the top surface of the body 41, whereas a lower lead 48b of the connector 45 is exposed to the bottom surface of the body 41. The film 49 fused to the lead plate 48 of the connector 45 is located within the body 41 and melts so as to completely bind to the body 41 during the molding process.

Figure 5:
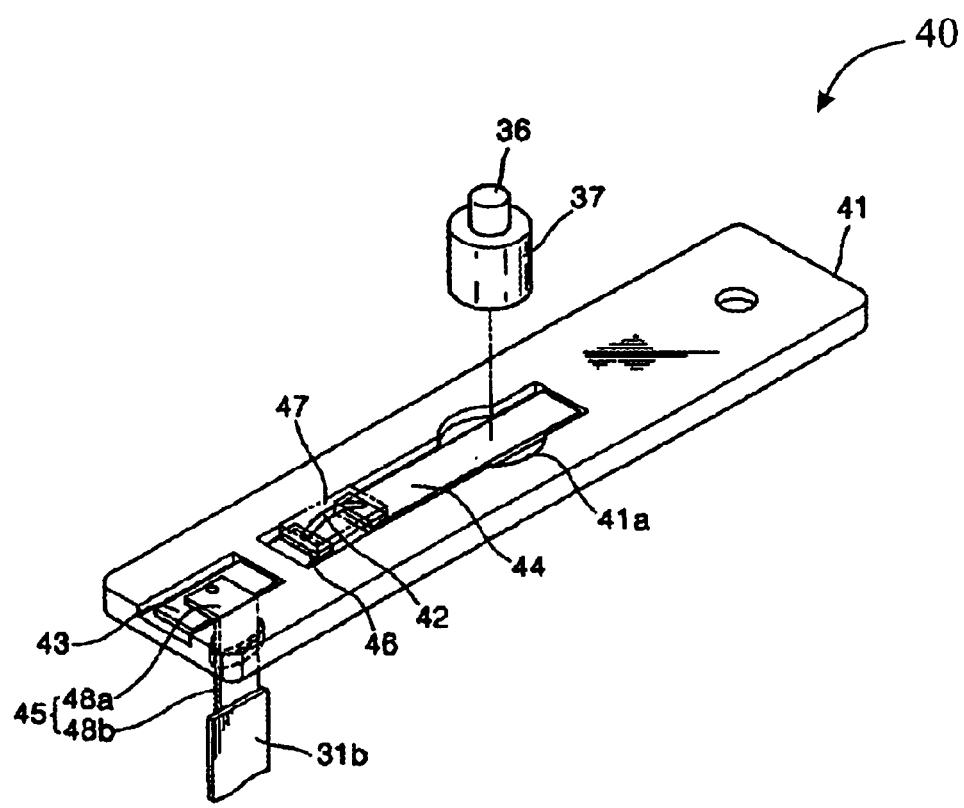
FIG. 5 is a perspective view of a complete assembly of the thermal protector of FIG. 4.

FIG. 5 is a perspective view of a complete assembly of the thermal protector 40 of FIG. 4. Referring to FIG. 5, in the mount area 41a of the body 41, the fuse 42 is placed. The tap lead 43, to which one end of the fuse 42 is welded, extends in one direction at one end of the mount area 41a. The terminal lead 44, to which the other end of the fuse 42 is welded, extends in the same direction at the other end of the mount area 41a. The terminal lead 44 is electrically connected to the electrode terminal 36 which is surrounded by the gasket 37.

At one end of the body 41, the connector 45 is attached. As described above with reference to FIG. 4, the lead plate 48 on which the film 49 is wound is integrated into the body 41 by insert molding, with the upper lead 48a of the lead plate 48 being exposed to the top surface of the body 41. The upper lead 48a is welded to the tap lead 43. The lower lead 48b of the lead plate 48, which is exposed to the bottom surface of the body 41, is welded to the anode lead 31b drawn from the battery unit 31.

In the thermal protector 40 having the above structure, the lower lead 48b is coupled to the anode lead 31b drawn from the battery unit 31, and the upper lead 48a extending from the lower lead 48b is coupled to the tap lead 43. The tap lead 43 is electrically connected to the terminal lead 44 via the fuse 42. The terminal lead 44 is electrically connected to the electrode terminal 36. Accordingly, the anode lead 31b is electrically connected to the electrode terminal 36 via the lower lead 48b, the upper lead 48a, the tap lead 43, the fuse 42, and the terminal lead 44.

A process of assembling the battery 30 with the thermal protector 40 having the above structure will be described.

Initially, referring to FIG. 3, the can 32 and the cap assembly 33, to be bound to the upper portion of the can 32 are provided. The battery unit 31, in which the cathode plate, the separator, and the anode plate sequentially disposed upon one another are wound like a "jelly-roll", is inserted into the can 32. The position of the anode lead 31b is considered to match the lower lead 48b of the thermal protector 40 for welding.

Next, the upper insulating plate 34 is placed in the battery unit 31, and the thermal protector 40 is inserted into the battery unit 31. The body 41 of the thermal protector 40 is press-fitted into the can 32. To this end, the body 41 is designed so as to have a surface area slightly larger than the can 32.

In general, through a gap between the inner wall of the can 32 and the edge of the body 41, the electrolyte permeates the thermal protector 40. However, according to the present invention, since the body 41 is formed of a polymeric resin which is likely to expand thermally with increasing temperatures and is press-fitted into the can 32, the body 41 expands towards the inner wall of the can 32 to completely seal the gap as heat is generated from the battery 30 during charging and discharging operations. As a result, the permeation of the electrolyte into the thermal protector 40 along the inner wall of the can 32 can be prevented.

Prior to the fitting of the thermal protector 40 into the can 32, the anode lead 31b drawn from the battery 31 needs to be electrically connected to the connector 45 (FIG. 5) of the thermal protector 40. The connector 45 having the lead plate 48, on which the multi-layered polymeric resin film 49 is wound, is connected to the body 41 by insert molding. The lower lead 48b of the lead plate 48 is exposed to the bottom surface of the body 41 and is welded to the anode lead 31b.

Next, in a state where the fuse 42 having both ends welded to the tap lead 43 and the terminal lead 44, respectively, is mounted in the mount area 41a of the body 41, the tap lead 43 is welded to the upper lead 48a of the lead plate 48, which is exposed to the top surface of the body 41. For convenience in assembly, prior to the welding of the tap lead 43 to the upper lead 48a, the terminal lead 44 is welded to the bottom of the electrode terminal 36 inserted through the hole 35a of the cap plate 35.

After the thermal protector 40 is installed in the can 32, the cap assembly 33 is placed on the thermal protector 40 and bound to the can 32 according to a general battery manufacturing process. Next, the electrolyte is injected through the electrolyte inject hole 35b formed in the cap plate 35, and the electrolyte inject hole 35b is sealed. The cathode lead 31a is welded to the can 32 or the cap plate 35.

In the battery 30 manufactured in the above-described manner, when the inner temperature of the battery 30 rises due to a failure (for example, overcharging), the temperature of the fuse 42 rises. When the temperature of the fuse 42 rises above a particular temperature, the fuse 42 blows. As a result, the current flow from the anode lead 31b to the electrode terminal 36 is forcibly cut off, thereby preventing undesirable reactions, such as thermal runaway.

Table 1 below shows the results of experiments on overcharging of batteries.

TABLE 1

| C-Rate | | Comparative Example 1 | Comparative Example 2 | Example |
|---|---|---|---|---|
| 1C | Whether it operates or not | — | 50/50 | 50/50 |
|  | Whether it has a failure or not | Favorable | Favorable | Favorable |
| 2C | Whether it operates or not | — | 48/50 | 50/50 |
|  | Whether it has a failure or not | Poor | Poor | Favorable |
| 3C | Whether it operates or not | — | 50/50 | 50/50 |

TABLE 1-continued

| C-Rate | Comparative Example 1 | Comparative Example 2 | Example |
|---|---|---|---|
| Whether it has a failure | Poor | Favorable | Favorable |

In Table 1, for the values expressed as N2/N1, N1 indicates the total number of batteries tested, and N2 indicates the number of the batteries where no failure occurred. Comparative Example 1 is for the case where no protector was mounted, and Comparative Example 2 is for the case where a conventional protector was mounted. In Example, the thermal protector 40 according to the present invention was mounted.

As shown in Table 1, when no protector was provided, the battery became unstable at 2C and 3C discharge rates. In this case, combustion or explosion may occur in those batteries. When the conventional protector was provided, although no combustion or explosion occurred in 3C high rate discharging, two of fifty batteries exploded at a 2C discharge rate.

However, in the battery 30 with the thermal protector 40 according to the present invention, since the fuse 42 correctly operated at a particular temperature, no combustion or explosion occurred at all discharge rates of 1C, 2C, and 3C. This is because the thermal protector 40 cut off current flow by sensing an increase in the temperature of the battery 30 when it was overcharged.

As described above, a secondary battery with the thermal protector according to the present invention provides the following effects.

First, when the inner temperature of the battery rises due to overcharging, the thermal protector installed in the can accurately detects the increase in temperature and cuts off current flow, thereby preventing thermal runaway and improving reliability.

Second, although the thermal protector is installed within the battery, no permeation of the electrolyte into the thermal protector occurs. As a result, the thermal protector can correctly operate at a particular temperature to block current overflow.

Third, since the thermal protector can be installed within the battery, a compact, lightweight battery ensuring safety can be manufactured.

Fourth, since an increase in the internal temperature of the battery is detected in the battery can, current flow can be timely cut off to rapidly react to thermal variations in the battery.

While the present invention has been particularly shown and described with reference to preferred embodiments thereof, it will be understood by those of ordinary skill in the art that various changes in form and detail may be made therein without departing from the spirit and scope of the present invention as defined by the appended claims.

What is claimed is:

1. A secondary battery comprising:
 a battery unit in which a cathode plate and an anode plate, and having an electrode lead extending therefrom;
 a can provided as a housing for the battery unit, and into which an electrolyte is injected;
 a cap assembly bound to an upper portion of the can; and
 thermal protector means installed in the can for electrically connecting the electrode lead from the battery unit to an electrode terminal, and for cutting off a current flow when the battery unit is overcharged;
 wherein the thermal protector means comprises a body, a fuse mounted on the body, a plurality of leads each connected to a respective end of the fuse, and a connector which is electrically connected to one of the plurality of leads; and
 wherein the body has a mount area for the fuse, and has a surface area slightly greater than a surface area of the can so as to be press-fitted into the can.

2. The secondary battery of claim 1, wherein the body is formed by molding using a material capable of expanding thermally, the body expanding toward an inner wall of the can as an internal temperature of the battery unit rises so as to block a leakage of the electrolyte through a gap between the inner wall of the can and the body.

3. The secondary battery of claim 1, wherein one end of the fuse is welded to a terminal lead electrically connected to the electrode terminal, and another end of the fuse is welded to a tap lead electrically connected to the electrode lead.

4. The secondary battery of claim 3, wherein outer margins of the fuse are welded to the plurality of leads and are coated with a sealing material for tight sealing purposes.

5. The secondary battery of claim 1, wherein the connector comprises:
 a lead plate; and
 a polymeric resin film wound on the lead plate.

6. The secondary battery of claim 5, wherein the connector is integrally formed with the body by insert molding.

7. The secondary battery of claim 6, wherein the lead plate comprises:
 an upper lead which is exposed to an upper surface of the body and is welded to a tap lead; and
 a lower lead which extends from the upper lead, is exposed to a bottom surface of the body, and is welded to the electrode lead.

8. The secondary battery of claim 7, wherein the electrode lead is electrically connected to the electrode terminal via the lower lead, the upper lead, the tap lead, the fuse, and a terminal lead to provide a current flow, and the current flow is cut off as a result of blowing of the fuse when the battery unit is overcharged.

9. The secondary battery of claim 1, wherein the fuse is formed of a low melting point material operable at a temperature in a range of about 85–120° C.

10. A secondary battery comprising:
 a battery unit including a cathode plate and an anode plate, and having an electrode lead extending therefrom;
 a can provided as a housing for the battery unit, and into which an electrolyte is injected;
 a cap assembly bound to an upper portion of the can; and
 thermal protector means installed in the can for electrically connecting the electrode lead from the battery unit to an electrode terminal, and for cutting off a current flow when the battery unit is overcharged.
 wherein the thermal protector means comprises a body, a fuse mounted on the body, a plurality of leads, each connected to a respective end of the fuse, and a connector electrically connected to one of the plurality of leads; and
 wherein the connector comprises a lead plate, and a polymeric resin film wound on the lead plate.

11. The secondary battery of claim 10, wherein the body has a mount area for the fuse, and has a surface area slightly greater than the can so as to be press-fitted into the can.

12. The secondary battery of claim 10, wherein the body is formed by molding using a material capable of expanding thermally, the body expanding toward an inner wall of the can as an internal temperature of the battery rises so as to block a leakage of the electrolyte through a gap between the inner wall of the can and the body.

13. The secondary battery of claim 10, wherein the plurality of leads includes a terminal lead electrically connected to the electrode terminal and a tap lead electrically connected to the electrode lead, and wherein one end of the fuse is welded to the terminal lead and another end of the fuse is welded to the tap lead.

14. The secondary battery of claim 13, wherein outer margins of the fuse are welded to the terminal lead and the tap lead, respectively, and are coated with a sealing material for tight sealing purposes.

15. The secondary battery of claim 10, wherein the connector is integrally formed with the body by insert molding.

16. The secondary battery of claim 10, wherein the plurality of leads includes a terminal lead electrically connected to the electrode terminal and a tap lead electrically connected to the electrode lead, and wherein the connector includes a lead plate which comprises:
   an upper lead which is exposed to an upper surface of the body and is welded to the tap lead; and
   a lower lead which extends from the upper lead, is exposed to a bottom surface of the body, and is welded to the electrode lead.

17. The secondary battery of claim 16, wherein the electrode lead is electrically connected to the electrode terminal via the lower lead, the upper lead, the tap lead, the fuse, and the terminal lead to provide a current flow, and the current flow is cut off as a result of blowing of the fuse when the battery unit is overcharged.

18. The secondary battery of claim 10, wherein the fuse is formed of a low melting point material operable at a temperature in a range of about 85–120° C.

19. The secondary battery of claim 1, wherein the thermal protector means is installed in a space between the cap assembly and the upper portion of the can.

20. The secondary battery of claim 10, wherein the thermal protector means is installed in a space between the cap assembly and the upper portion of the can.

21. A secondary battery, comprising:
   a battery unit including a cathode plate and an anode plate, and having an electrode lead extending therefrom;
   a can provided as a housing for the battery unit, and into which an electrolyte is injected;
   a cap assembly bound to an upper portion of the can; and
   thermal protector means installed in the can for electrically connecting the electrode lead from the battery unit to an electrode terminal, and for cutting off a current flow when the battery unit is overcharged;
   wherein the thermal protector means comprises a fuse, and wherein one end of the fuse is welded to a terminal lead electrically connected to the electrode terminal, and another end of the fuse is welded to a tap lead electrically connected to the electrode lead, and wherein outer margins of the fuse are respectively welded to the terminal lead and the tap lead, and are coated with a sealing material for tight sealing purposes; and
   wherein said thermal protector means has a mount area for the fuse having a surface area slightly greater than the can so as to be press-fitted into the can.

22. The secondary battery of claim 21, wherein the body is formed by molding using a material capable of expanding thermally, the body expanding toward an inner wall of the can as an internal temperature of the battery rises so as to block a leakage of the electrolyte through a gap between the inner wall of the can and the body.

23. The secondary battery of claim 21, further comprising a connector electrically connected to the tap lead, said connector including a lead plate which comprises:
   an upper lead which is exposed to an upper surface of the body and is welded to the tap lead; and
   a lower lead which extends from the upper lead, is exposed to a bottom surface of the body, and is welded to the electrode lead.

24. The secondary battery of claim 23, wherein the connector comprises a lead plate; and a polymeric resin film wound on the lead plate.

25. The secondary battery of claim 23, wherein the connector is integrally formed with the body by insert molding.

26. The secondary battery of claim 21, wherein the electrode lead is electrically connected to the electrode terminal via the lower lead, the upper lead, the tap lead, the fuse, and the terminal lead to provide a current flow, and the current flow is cut off as a result of blowing of the fuse when the battery unit is overcharged.

27. The secondary battery of claim 21, wherein the fuse is formed of a low melting point material operable at a temperature in a range of about 85–120° C.

28. The secondary battery of claim 21, wherein the thermal protector means is installed in a space between the cap assembly and the upper portion of the can.

* * * * *